US010391637B2

(12) United States Patent
Miyake et al.

(10) Patent No.: US 10,391,637 B2
(45) Date of Patent: Aug. 27, 2019

(54) SELF-PROPELLED ROBOT

(71) Applicant: MIRAIKIKAI, INC., Kurashiki-shi, Okayama (JP)

(72) Inventors: Tohru Miyake, Takamatsu (JP); Kazuo Morita, Takamatsu (JP); Hideto Matsuuchi, Takamatsu (JP)

(73) Assignee: MIRAIKIKAI, INC., Kurashiki-shi, Okayama (JP)

( * ) Notice: Subject to any disclaimer, the term of this patent is extended or adjusted under 35 U.S.C. 154(b) by 267 days.

(21) Appl. No.: 15/321,586

(22) PCT Filed: Jun. 25, 2015

(86) PCT No.: PCT/JP2015/068409
§ 371 (c)(1),
(2) Date: Dec. 22, 2016

(87) PCT Pub. No.: WO2015/199198
PCT Pub. Date: Dec. 30, 2015

(65) Prior Publication Data
US 2017/0157775 A1    Jun. 8, 2017

(30) Foreign Application Priority Data
Jun. 25, 2014   (JP) ................... 2014-130403

(51) Int. Cl.
*B25J 11/00*   (2006.01)
*B25J 5/00*   (2006.01)
(Continued)

(52) U.S. Cl.
CPC ........... *B25J 11/0085* (2013.01); *A47L 9/009* (2013.01); *A47L 9/04* (2013.01); *A47L 9/2852* (2013.01);
(Continued)

(58) Field of Classification Search
CPC .......... H02S 40/10; F24S 40/20; F24S 80/00; A47L 9/04; A47L 9/2852; A47L 2201/04;
(Continued)

(56) References Cited

U.S. PATENT DOCUMENTS

2013/0025957 A1*   1/2013   Ellsworth ............... A01D 34/64
                                                    180/210
2014/0230711 A1*   8/2014   Lovelace ................ B63B 59/08
                                                    114/222
(Continued)

FOREIGN PATENT DOCUMENTS

EP            2366964 A1    9/2011
JP        S62-125684 U     8/1987
(Continued)

OTHER PUBLICATIONS

International Search Report of PCT/JP2015/068409.

*Primary Examiner* — Bao Long T Nguyen
(74) *Attorney, Agent, or Firm* — Muncy, Geissler, Olds & Lowe, P.C.

(57) ABSTRACT

Provided is a self-propelled robot that can prevent damage due to dropping of the self-propelled robot and efficiently perform the operation on a flat surface. A self-propelled robot 1 that self-travels on a structure SP having a flat surface SF to perform operation on the flat surface SF of the structure SP, the self-propelled robot includes: a robot main body 2 in which a moving unit 4 for the self-travel is provided; and a controller 30 that controls movement of the robot main body 2. At this point, the controller 30 includes an edge detector 31 that detects an end edge of the flat surface SF, and the controller 30 has a function of controlling activation of the moving unit 4 such that a distance between the end edge of the flat surface SF and the moving
(Continued)

unit 4 is maintained to a given extent or more based on a signal from the edge detector 31.

15 Claims, 11 Drawing Sheets

(51) Int. Cl.
| | |
|---|---|
| *B25J 13/08* | (2006.01) |
| *G05D 1/02* | (2006.01) |
| *H02S 40/10* | (2014.01) |
| *A47L 9/00* | (2006.01) |
| *A47L 9/04* | (2006.01) |
| *A47L 9/28* | (2006.01) |
| *B08B 1/00* | (2006.01) |
| *B08B 3/02* | (2006.01) |
| *F24S 80/00* | (2018.01) |
| *F24S 40/20* | (2018.01) |

(52) U.S. Cl.
CPC .............. *B08B 1/002* (2013.01); *B08B 1/006* (2013.01); *B08B 3/02* (2013.01); *B08B 3/024* (2013.01); *B25J 5/005* (2013.01); *B25J 5/007* (2013.01); *B25J 13/088* (2013.01); *F24S 40/20* (2018.05); *F24S 80/00* (2018.05); *G05D 1/02* (2013.01); *G05D 1/024* (2013.01); *H02S 40/10* (2014.12); *A47L 2201/04* (2013.01); *G05D 2201/0203* (2013.01); *Y02E 10/40* (2013.01); *Y10S 901/01* (2013.01)

(58) Field of Classification Search
CPC ..... A47L 2201/06; B08B 1/002; B08B 1/006; B08B 3/02; B08B 3/024; B25J 11/0085; B25J 5/005; B25J 5/007; B25J 13/088; B25J 13/089; G05D 1/02; G05D 1/024; G05D 2201/0203; G05D 1/0223; G05D 13/00; G05D 1/0055; Y02E 10/40; Y10S 901/01
USPC ............ 700/258, 250, 253; 701/41, 70, 116; 901/1

See application file for complete search history.

(56) References Cited

U.S. PATENT DOCUMENTS

2015/0366130 A1\* 12/2015 Bergstrom ........... G05D 1/0259 701/23
2016/0068183 A1\* 3/2016 Matsuoka ............ B62D 7/1509 701/41

FOREIGN PATENT DOCUMENTS

| JP | H06-28032 A | 2/1994 |
|---|---|---|
| JP | H07-334242 A | 12/1995 |
| JP | H08-152916 A | 6/1996 |
| JP | 2004-166968 A | 6/2004 |
| JP | 2010-186819 A | 8/2010 |

\* cited by examiner (A)

(B)

SELF-PROPELLED ROBOT

TECHNICAL FIELD

The present invention relates to a self-propelled robot. More particularly, the present invention relates to a self-propelled robot that performs operation such as cleaning on a surface of a solar cell array used in solar power generation and a surface of a condensing mirror used in solar thermal power generation in an self-travel manner.

BACKGROUND ART

Nowadays, a demand for power generation using renewable energy increases, and particularly solar power generation or solar thermal power generation using sunlight attracts attention.

For example, a solar power generation facility ranges from a facility having a power generation capacity of about 3 kilowatts to about 4 kilowatts provided in a standard home to a commercial large-scale power generation facility having a power generation capacity exceeding 1 megawatt. Even in the solar thermal power generation facility, there are many large-scale facilities having the power generation capacity exceeding 1 megawatt, and the solar thermal power generation facility is also expected as the alternative power generation facility for thermal power generation or nuclear power generation.

The power is generated by receiving solar radiation light from the sun in power generation such as the solar power generation and the solar thermal power generation, in which sunlight is used. Therefore, when a light receiving surface of the solar cell array (that is, a solar cell module) or the condensing mirror gets dirty, in the solar power generation, light transmission of a cover glass constituting the light receiving surface of the solar cell module degrades according to a level of dirt to decrease a power generation amount. In the solar thermal power generation, a reflection rate of the condensing mirror degrades to decrease the power generation amount. That is, in the solar power generation or solar thermal power generation, when the light receiving surface of the solar cell module or condensing mirror gets dirty, power generation performance degrades largely.

Therefore, it is necessary to properly clean the solar cell array and the like to remove dirt on the light receiving surface of the solar cell array and the like.

The facility provided in a standard home can periodically be cleaned by a person. On the other hand, because the large-scale solar power generation facility has a huge surface area, it is difficult for a person to clean to remove dirt on the surface of the solar cell array. For example, it is assumed that a 1-megawatt solar power generation facility is constructed with solar cell modules each of which has power generation output of 100 watts. In this case, 10000 solar cell modules are provided in the whole solar power generation facility. In the case that one solar cell module has a 1-square-meter area, the area to be cleaned becomes 10000 square meters. Plural solar cell arrays each of which has a set of plural solar cell modules are provided in the solar power generation facility, the area of solar cell array ranges from about 50 square meters to about 1000 square meters although it depends on various field conditions. Accordingly, the self-propelled robot that can run on the surface of the solar cell array and the like in an automatic or remote control manner becomes efficient cleaning unit in the large-scale solar power generation facility.

Nowadays various autonomous-travel cleaning robots are developed in order to automatically clean a building floor and the like (for example, see Patent Document 1), and it is conceivable that these autonomous-travel cleaning robots are used as the robot that cleans the solar cell array and the like.

PRIOR ART DOCUMENT

Patent Document

Patent Document 1: JP-A-2004-166968

SUMMARY OF THE INVENTION

Problems to be Solved by the Invention

However, the autonomous-travel cleaning robot of Patent Document 1 performs the indoor cleaning such as the cleaning of the building floor. An end edge of the floor is partitioned by a wall, and the autonomous-travel cleaning robot detects an obstacle by touching the obstacle such as wall, thereby determining a floor area to be cleaned. However, for the solar cell array and the like, a boundary cannot be determined because the obstacle does not exist on the surface. Unless the autonomous-travel cleaning robot determines the boundary, possibly the autonomous-travel cleaning robot is dropped from the surface and damaged.

Additionally, for the solar cell array and the like, because deficient cleaning is directly linked to degradation of power generation efficiency, it is necessary to prevent occurrence of the deficient cleaning. Usually the autonomous-travel cleaning robot that automatically cleans the building floor and the like is controlled so as to randomly run. Even if the autonomous-travel cleaning robot is randomly moved to perform the cleaning, the deficient cleaning can be prevented when the cleaning is continued for a certain amount of time. However, for the solar cell array and the like, the power generation efficiency degrades or the power cannot be generated during the cleaning time. Therefore, desirably the cleaning time of the autonomous-travel cleaning robot can be shortened as much as possible.

An object of the present invention is to provide a self-propelled robot that can prevent the damage due to the dropping of the self-propelled robot and efficiently perform the operation on a flat surface.

Means for Solving the Problems

According to a first aspect of the present invention, a self-propelled robot that self-travels on a structure having a flat surface to perform operation on the flat surface of the structure, the self-propelled robot includes: a robot main body in which a moving unit for the self-travel is provided; and a controller that controls movement of the robot main body. At this point, the moving unit includes: a wheel or a crawler that runs on the flat surface; and a driving unit that drives the wheel or the crawler, and the controller has a function of controlling the activation of the moving unit such that a rotation plane direction of the wheel or the crawler is substantially orthogonal to an inclination direction of the flat surface when the self-propelled robot is caused to stand still on the flat surface.

According to a second aspect of the present invention, a self-propelled robot that self-travels on a structure having a flat surface to perform operation on the flat surface of the structure, the self-propelled robot includes: a robot main body in which a moving unit for the self-travel is provided; and a controller that controls movement of the robot main body. At this point, the controller includes an edge detector that detects an end edge of the flat surface, the moving unit includes: a wheel or a crawler that runs on the flat surface; and a driving unit that drives the wheel or the crawler, and the controller has a function of controlling the activation of the moving unit such that a rotation plane direction of the wheel or the crawler is substantially orthogonal to an inclination direction of the flat surface when the self-propelled robot is caused to stand still on the flat surface.

According to a third aspect of the present invention, a self-propelled robot that self-travels on a structure having a flat surface to perform operation on the flat surface of the structure, the self-propelled robot includes: a robot main body in which a moving unit for the self-travel is provided; and a controller that controls movement of the robot main body. At this point, the controller includes an edge detector that detects an end edge of the flat surface, the controller has a function of controlling activation of the moving unit such that a distance between the end edge of the flat surface and the moving unit is maintained to a given extent or more based on a signal from the edge detector, the moving unit includes: a wheel or a crawler that runs on the flat surface; and a driving unit that drives the wheel or the crawler, and the controller has a function of controlling the activation of the moving unit such that a rotation plane direction of the wheel or the crawler is substantially orthogonal to an inclination direction of the flat surface when the self-propelled robot is caused to stand still on the flat surface.

According to a fourth aspect of the present invention, in the self-propelled robot of one of the first to third aspects, the moving unit includes: a wheel that runs on the flat surface; and a driving unit that drives the wheel, a contact sensor that detects derailment is provided in a bottom surface of the robot main body, and the controller stops the activation of the driving unit when the contact sensor detects a signal indicating contact with the flat surface.

According to a fifth aspect of the present invention, in the self-propelled robot of one of the first to third aspects, the moving unit includes: a wheel that runs on the flat surface; and a driving unit that drives the wheel, a contact sensor that detects derailment is provided in a bottom surface of the robot main body, and the controller activates the driving unit such that a driving resistance is generated in the wheel when the contact sensor detects a signal indicating contact with the flat surface.

According to a sixth aspect of the present invention, in the self-propelled robot of the fourth or fifth aspect, the contact sensor is installed inside a rotation axis of each wheel.

According to a seventh aspect of the present invention, in the self-propelled robot of the sixth aspect, four wheels are provided, and the contact sensor is also installed outside the rotation axis of each wheel.

According to an eighth aspect of the present invention, in the self-propelled robot of one of the first to third aspects, the moving unit includes: a crawler that runs on the flat surface; and a driving unit that drives the crawler, a deflection sensor that detects deflection of a belt of the crawler is provided, and the controller stops the activation of the driving unit when the deflection sensor detects the deflection of the belt.

According to a ninth aspect of the present invention, in the self-propelled robot of one of the first to third aspects, the moving unit includes: a crawler that runs on the flat surface; and a driving unit that drives the crawler, a deflection sensor that detects deflection of a belt of the crawler is provided, and the controller activates the driving unit such that a driving resistance is generated in the belt when the deflection sensor detects the deflection of the belt.

According to a tenth aspect of the present invention, in the self-propelled robot of one of the first to ninth aspects, a resistance member is provided in the bottom surface of the robot main body.

According to an eleventh aspect of the present invention, in the self-propelled robot of one of the first to third aspects, the controller has a function of controlling the activation of the moving unit such that the self-propelled robot moves along the end edge of the flat surface based on a signal from the edge detector.

According to a twelfth aspect of the present invention, the self-propelled robot of the eleventh aspect further includes a cleaning unit that cleans the flat surface. At this point, the cleaning unit is provided such that a length in a direction intersecting a running direction of the robot main body is longer than a half of a width of the flat surface and shorter than the width of the flat surface.

According to a thirteenth aspect of the present invention, the self-propelled robot of the eleventh aspect further includes a cleaning unit that cleans the flat surface. At this point, the cleaning unit is provided such that a length in a direction intersecting a running direction of the robot main body is longer than a half of a long side of the flat surface and shorter than the long side the flat surface.

Effect of the Invention

In the first aspect of the present invention, even if the driving force or braking force of the moving unit is weakened, the self-propelled robot can be caused to stably stand still on the flat surface of the structure.

In the second aspect of the present invention, the edge is detected, so that the self-propelled robot can be prevented from dropping or derailing from the flat surface. Even if the driving force or braking force of the moving unit is weakened, the self-propelled robot can be caused to stably stand still on the flat surface.

In the third aspect of the present invention, the distance between the end edge of the flat surface and the moving unit is maintained to a predetermined extent or more, so that the self-propelled robot can be prevented from dropping or derailing from the flat surface. Accordingly, the self-propelled robot can stably perform the operation. Even if the driving force or braking force of the moving unit is weakened, the self-propelled robot can be caused to stably stand still on the flat surface.

In the fourth aspect of the present invention, the contact sensor contacts the flat surface when the self-propelled robot derails from the flat surface, so that the derailment can be recognized. The controller stops the activation of the driving unit, and the activation of the self-propelled robot is stopped, so that the dropping of the self-propelled robot can be prevented.

In the fifth aspect of the present invention, the contact sensor contacts the flat surface when the self-propelled robot derails from the flat surface, so that the derailment can be recognized. The controller activates the driving unit such that the driving resistance is generated in the wheel. Therefore, the dropping of the self-propelled robot can be prevented.

In the sixth and seventh aspects of the present invention, the contact sensor can surely detect the derailment while the self-propelled robot does not derail from the flat surface.

In the eighth aspect of the present invention, in the case that the crawler projects from the flat surface to a predetermined extent or more, the contact sensor detects the projection of the crawler by the deflection of the belt. The controller stops the activation of the driving unit, and the activation of the self-propelled robot is stopped, so that the dropping of the self-propelled robot can be prevented.

In the ninth aspect of the present invention, in the case that the crawler projects from the flat surface to a predetermined extent or more, the contact sensor detects the projection of the crawler by the deflection of the belt. The controller activates the driving unit such that the driving resistance is generated in the belt. Therefore, the dropping of the self-propelled robot can be prevented.

In the tenth aspect of the present invention, the resistance member contacts the flat surface when the derailment or the like occurs, so that the robot main body can be prevented from dropping from the flat surface.

In the eleventh aspect of the present invention, because the self-propelled robot moves along the end edge of the flat surface, the operation such as the cleaning can efficiently be performed on the flat surface such that omission of the operation is prevented.

In the twelfth or thirteenth aspect of the present invention, even if the self-propelled robot is miniaturized, the cleaning can efficiently be performed without the occurrence of the deficient cleaning.

BRIEF DESCRIPTION OF THE DRAWINGS

FIG. 4(A) illustrates the case that one sensor 31s is provided, and FIG. 4(B) illustrates the case that two sensors 31s are provided.

MODE FOR CARRYING OUT THE INVENTION

Figure 1:
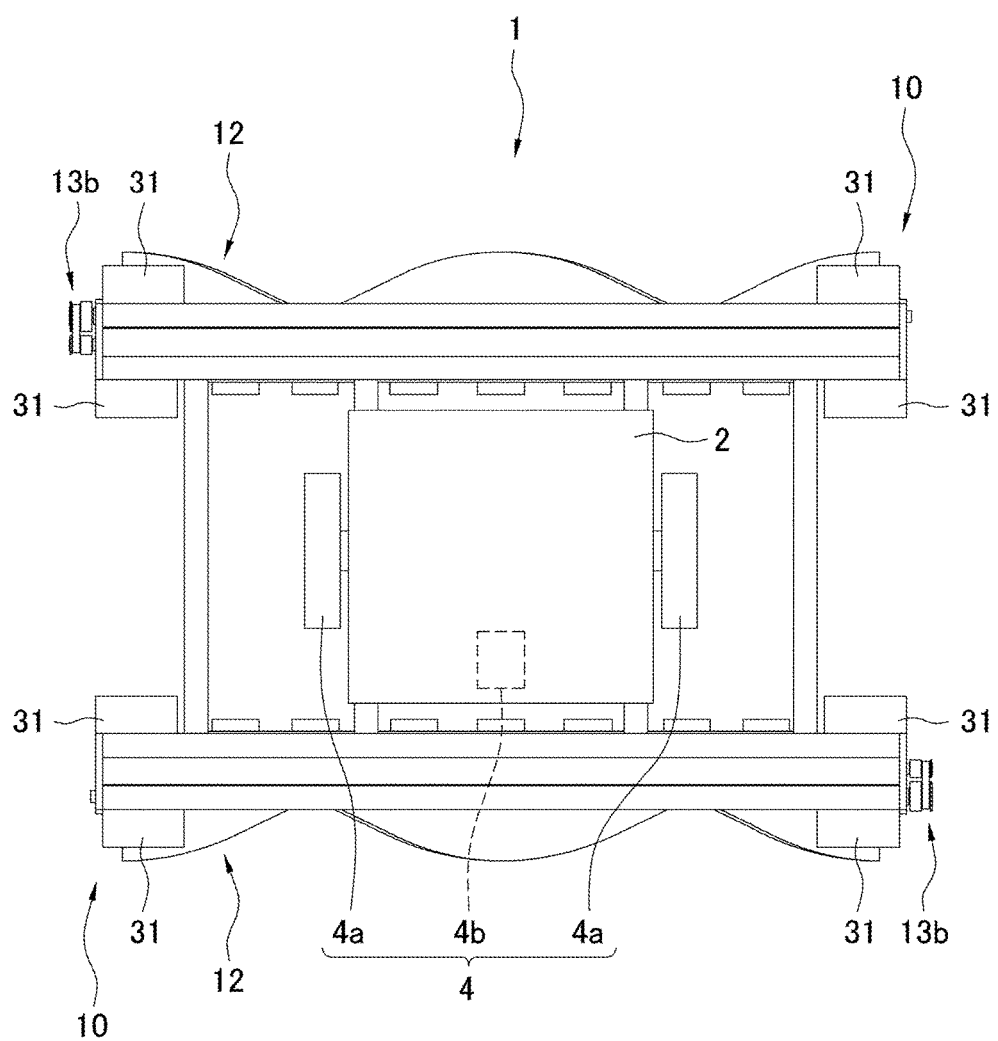
FIG. 1 is a schematic plan view illustrating a self-propelled robot 1 according to an embodiment.

The self-propelled robot of the present invention is a robot that performs the operation in flat surface portions. Examples of the flat surface portions include a roof, a wall surface, and a window glass of the outdoor structure or building, the solar cell array, the condensing mirror used in the solar thermal power generation, structures such as a signboard and an electric bulletin board, a flat surface portions of various vehicles such as a bus and a train or an air plane, various plate-like members such as a metallic plate, a glass plate, a synthetic resin plate, and a wood plate, and an indoor space such as downward stairs or a upper frame member. One of the features of the self-propelled robot of the present invention is that the operation can efficiently be performed while the self-propelled robot moves in the flat surface portion.

In the description, the flat surface is a concept including a surface having a curvature to a certain extent. For example, the concept includes a curved surface having a curvature that has no influence on the running of the self-propelled robot like a surface having a curvature radius efficiently larger than a distance (such as a wheelbase and a tread) between grounding points of the moving unit of the self-propelled robot.

There is no limitation to the operation performed with the self-propelled robot of the present invention. Examples of the operation include the cleaning or flaw inspection of the flat surface on which the self-propelled robot runs, measurement of a surface shape or a thickness of a member, temperature measurement, surface roughness measurement, measurement of optical reflectance or glossiness in the surface, measurement of other physical properties, collection or observation, peel-off of a surface adhesion or coating, the coating and an underlying treatment before the coating, coating operation, adhesion of a film, polishing, marking, and communication conducted by presenting information.

(Target Flat Surface SF of Structure SP)

Before the description of a self-propelled robot 1 according to an embodiment, a structure SP on which the self-propelled robot 1 performs the operation such as the cleaning and a target flat surface SF will briefly be described below.

For example, the structure SP on which the self-propelled robot 1 performs the operation such as the cleaning is the solar cell array of the large-scale solar power generation facility, the condensing mirror used in the solar thermal power generation facility, or a solar water heater. In the structure SP, the target flat surface SF is inclined relative to a horizontal plane. At an end edge of the target flat surface SF, an angle formed between the target flat surface SF and its side surface becomes about 90°. The self-propelled robot 1 has a structure in which possibly the self-propelled robot 1 drops or derails from the end edge when traveling on the target flat surface SF. The self-propelled robot 1 aims at the operation such as the cleaning on the target flat surface SF of the structure SP having the end edge.

The structure SP and target flat surface SF on which the self-propelled robot 1 performs the operation such as the cleaning are not limited to the solar cell array of the solar power generation facility, the condensing mirror used in the solar thermal power generation facility, or the solar water heater. The operation such as the cleaning can be performed on any structure SP having the target flat surface SF as described above.

The case that the self-propelled robot cleans the surface (namely, each light receiving surface, hereinafter referred to as the target flat surface SF) of the structure SP such as the solar cell array, the condensing mirror used in the solar thermal power generation facility, and the solar water heater will be described below. In the case that the self-propelled robot 1 performs the operation except for the cleaning, a pair of cleaning units 10 and 10 (to be described later) is not provided, but an operating device, a sensor, a tool, or the like is provided. In this case, the operating device, the sensor, or the tool may be provided at any position of the robot main body 2. For example, the operating device, the sensor, or the tool may be attached to the position where the pair of cleaning units 10 and 10 (or one of the cleaning units 10 and 10) is provided, or the operating device, the sensor, or the tool may be provided on a side surface, a top surface, or a bottom surface of the robot main body 2. It is only necessary to provide the operating device, the sensor, or the tool at a proper position according to a use or a function.

(Self-Propelled Robot 1)

The self-propelled robot 1 will be described below.

The self-propelled robot 1 self-travels on the target flat surface SF of the structure SP to perform the operation such as the cleaning on the target flat surface SF of the structure SP.

Figure 2:
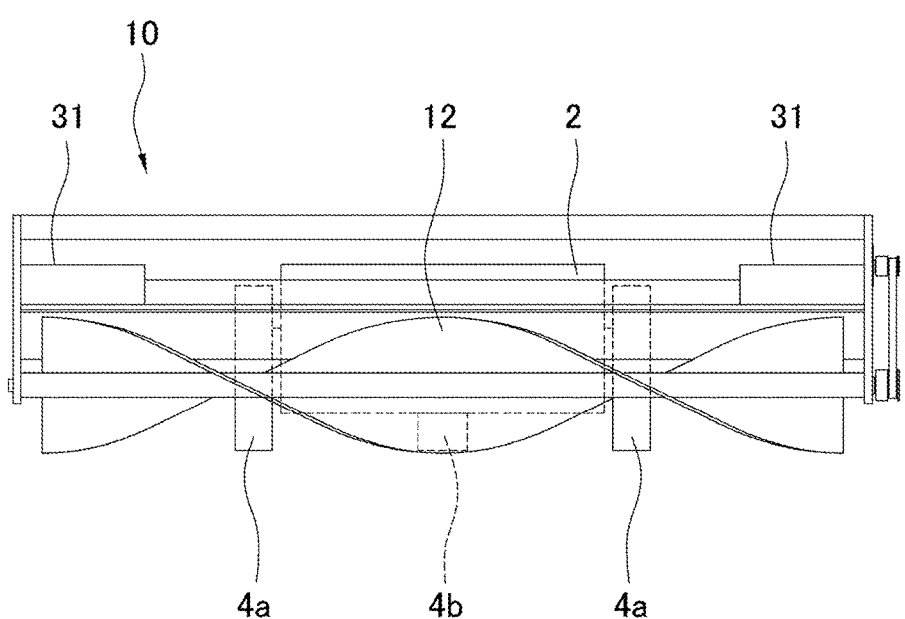
FIG. 2 is a schematic front view illustrating the self-propelled robot 1 of the embodiment.
Figure 6:
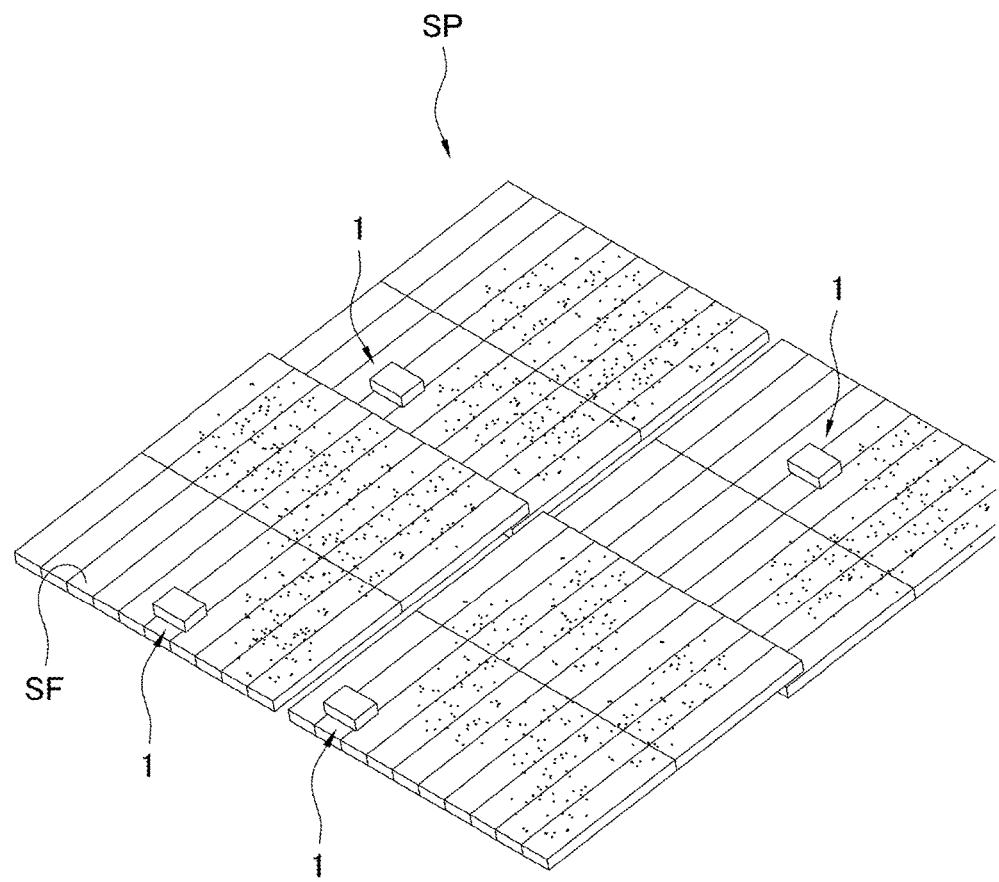
FIG. 6 is a schematic explanatory view illustrating a structure SP on which the self-propelled robot 1 of the embodiment performs operation such as cleaning.

As illustrated in FIGS. 1 and 2, the self-propelled robot 1 includes the robot main body 2 provided with a moving unit 4 that travels on the target flat surface SF (see FIG. 6) of the structure SP, the pair of cleaning units 10 and 10 provided in the robot main body 2, and a controller 30 that controls activation of the moving unit 4 or the pair of cleaning units 10 and 10.

(Pair of Cleaning Units 10 and 10)

As illustrated in FIGS. 1 and 2, the pair of cleaning units 10 and 10 is provided in front of and at the back of the robot main body 2, respectively. The cleaning unit 10 includes a rotating brush 12, and the brush 12 is rotated to be able to wipe the target flat surface SF.

There is no particular limitation to the structure of the cleaning unit 10, namely, how the cleaning unit 10 cleans the target flat surface SF of the structure SP. For example, a sprinkler (such as a spray nozzle) and a wiper blade (squeegee) may be provided instead of the brush 12 to constitute the cleaning unit 10. Instead of or together with the brush 12, a vacuum cleaner (suction type cleaner) may be provided to constitute the cleaning unit 10.

Although the pair of cleaning units 10 and 10 is provided in front of and at the back of the robot main body 2, the cleaning unit 10 may be provided only in front of or at the back of the robot main body 2.

There is no particular limitation to the position where the cleaning unit 10 is provided, but the cleaning unit 10 may be provided in a bottom surface of the robot main body 2 or at the position facing the target flat surface SF.

(Moving Unit 4)

As illustrated in FIGS. 1 and 2, the moving unit 4 is provided in the robot main body 2. The moving unit 4 is provided so as to be able to move the robot main body 2 in a front-back direction or to turn the robot main body 2. For example, as illustrated in FIGS. 1 and 2, the moving unit 4 may be constructed with a pair of lateral driving wheels 4a and 4a and one intermediate driving wheel 4b. In this case, when the pair of lateral driving wheels 4a and 4a and the intermediate driving wheel 4b are disposed so as to form a triangle in planar view, the self-propelled robot 1 can stably be disposed on the target flat surface SF. In this case, a driving motor is provided in each of all the driving wheels 4a and 4b of the moving unit 4, and the driving motor can independently drive each of the driving wheels 4a and 4b. When the controller 30 controls an activation state of each driving motor, the self-propelled robot 1 can linearly or turnably be moved. Particularly, when an omni wheel (omnidirectional moving wheel) is used as the intermediate driving wheel 4b, the self-propelled robot 1 can smoothly be turned, and a freedom degree of the movement of the self-propelled robot 1 can be enhanced.

The driving unit 4 is not limited to the above configuration, but the driving unit 4 may have any configuration as long as the driving unit 4 can linearly or turnably move the self-propelled robot 1. For example, the omni wheel that is of the intermediate driving wheel 4b is not used as the driving wheel, but only the pair of driving wheels 4a and 4a may be used as the driving wheel. Instead of the omni wheel, a passive wheel (caster) may be used as the intermediate driving wheel 4b. Even in this case, the moving direction of the self-propelled robot 1 can freely be changed by adjusting the rotation speed of the pair of driving wheels 4a and 4a. The self-propelled robot 1 may have a structure similar to that of a vehicle such as a passenger car. That is, four wheels are provided, and the two front (or rear) wheels may be used as a steering wheel while other wheels are used as a driving wheel, or the four wheels may be used as the driving wheel.

In the moving unit 4, a crawler may be provided instead of the wheel. In this case, when a pair of crawlers is provided such that a center (center of gravity) of the robot main body 2 is sandwiched therebetween (see FIG. 11), the self-propelled robot 1 can linearly or turnably be moved by controlling the activation of the driving motor that drives the pair of crawlers.

The driving motor of the moving unit 4 corresponds to the driving unit of the moving unit in claims of the present invention.

(Controller 30)

The controller 30 has a function of controlling the activation of the moving unit 4 to control the movement of the self-propelled robot 1. For example, as described above, in the case that the driving motor is provided in each driving wheel 4, the activation of the driving motor provided in the driving wheel 4 is controlled to control a moving direction or a moving speed of the robot main body 2, namely, the moving direction or moving speed of the self-propelled robot 1. For example, the self-propelled robot 1 can be moved straight in the case that the driving motors 4m are activated such that the moving speed (specifically, rotation speed (revolving speed)×circumferential length of driving wheel) of all the driving wheels 4 are equal to one another. On the other hand, the self-propelled robot 1 can be moved so as to turn in the case that the driving motors 4m are activated such that a difference in moving speed is generated between the pair of lateral driving wheels 4a and 4a.

The controller 30 has a function of detecting a direction of the self-propelled robot 1.

For example, in the case that the target flat surface SF is inclined, the controller 30 may have a function of detecting whether the front-back direction (or a crosswise direction) of the robot main body 2 is inclined relative to the horizontal plane, and of recognizing the direction of the robot main body 2 from the inclination.

For example, the controller 30 includes an inclination sensor, and the inclination sensor has a function of detecting the inclination of the robot main body 2 in the case that one of front and rear portions of the robot main body 2 is located above (or below) relative to the other. In this case, because an inclination angle of the target flat surface SF is usually kept constant, the controller 30 can detect the front-back direction of the self-propelled robot 1 is inclined relative to a vertical direction of the target flat surface SF in the case that the inclination sensor detects a change in inclination of the robot main body 2. When the inclination angle of the target flat surface SF is previously stored in the controller 30, how much the front-back direction of the self-propelled robot 1 is inclined relative to the vertical direction of the target flat surface SF can be recognized by the inclination angle detected with the inclination sensor.

The method in which the controller 30 detects the direction of the self-propelled robot 1 is not limited to the above method. For example, the direction of the self-propelled robot 1 can be recognized when a gyro sensor, a geomagnetic sensor, or an acceleration sensor is provided. For the gyro sensor, the direction of the self-propelled robot 1 can be recognized when obtained angular velocity is integrated. The use of the geomagnetic sensor or acceleration sensor can directly detect an orientation (azimuth). A goniometer (inclination angle meter) that detects an attitude relative to a gravity direction can also detect the direction of the self-propelled robot 1.

In the case that the target flat surface SF is a non-inclined surface (a horizontal flat surface), the direction of the robot main body 2 can be recognized when the controller 30 includes the gyro sensor or the geomagnetic sensor. For the gyro sensor, the direction of the self-propelled robot 1 can be recognized when the detected angular velocity is integrated. For the geomagnetic sensor, the orientation (azimuth) can directly be detected.

The self-propelled robot 1 has the above configuration, so that the self-propelled robot 1 can clean the target flat surface SF of the structure SP when being placed on the target flat surface SF of the structure SP. That is, the moving unit 4 can move the self-propelled robot 1 on the target flat surface SF, so that the pair of cleaning units 10 and 10 can clean the target flat surface SF.

For example, in the case that the rectangular solar cell module or the like is cleaned, the front-back direction of the robot main body 2 is disposed so as to be parallel to a major axis direction of the solar cell module. When the self-propelled robot 1 runs, the self-propelled robot 1 is moved along the major axis direction of the solar cell module, so that the surface of the solar cell module can be cleaned with the pair of cleaning units 10 and 10.

In the case that the rectangular solar cell module or the like is cleaned, the front-back direction of the robot main body 2 may be disposed so as to be parallel to a minor axis direction (width direction) of the solar cell module. In this case, when the self-propelled robot 1 runs, the self-propelled robot 1 is moved along the minor axis direction of the solar cell module, so that the surface of the solar cell module can be cleaned with the pair of cleaning units 10 and 10.

From the viewpoint of operating efficiency, frequently the self-propelled robot 1 is moved along the major axis direction of the solar cell module or the like. However, in the case that the solar cell module or the like is provided while inclined, the following advantage can be obtained by moving the self-propelled robot 1 along the minor axis direction of the solar cell module.

In the case that the solar cell module or the like is provided while inclined, generally the major axis direction is inclined relative to the horizontal plane while the minor axis direction becomes even. In such cases, when the self-propelled robot 1 is moved along the major axis direction, sometimes it is necessary for the self-propelled robot 1 to climb the inclination. At this point, large driving force is required because the self-propelled robot 1 is moved while resisting force downwardly pulling the self-propelled robot 1. Because rotation planes of the driving wheels 4a and 4a are parallel to the inclination direction, possibly the driving wheels 4a and 4a rotate downward by the downwardly pulling force in case that the driving force driving the driving wheels 4a and 4a is eliminated (for example, battery capacity drop). Possibly the self-propelled robot 1 runs and drops from the solar cell module. On the other hand, in the case that the self-propelled robot 1 is moved along the minor axis direction, the driving wheels 4a and 4a rotate while the rotation planes of the driving wheels 4a and 4a are orthogonal to the inclination direction. Therefore, the driving force can be decreased because the self-propelled robot 1 is moved without resisting the downwardly pulling force. Because the rotation planes of the driving wheels 4a and 4a are orthogonal to the inclination direction, possibly the driving wheels 4a and 4a do not rotate downward by the downwardly pulling force in case that the driving force driving the driving wheels 4a and 4a is eliminated. That is, a possibility that the self-propelled robot 1 runs and drops from the solar cell module can be decreased. Accordingly, in the case that the self-propelled robot 1 is moved along the minor axis direction of the solar cell module or the like, the possibility that the self-propelled robot 1 runs and drops from the solar cell module can be decreased even if the driving force driving the driving wheels 4a and 4a is eliminated.

In the case that the solar cell module or the like is provided with the minor axis direction thereof inclined relative to the horizontal plane, the similar advantage can be obtained by moving the self-propelled robot 1 along the major axis direction of the solar cell module.

(Static Attitude Control)

Figure 3:
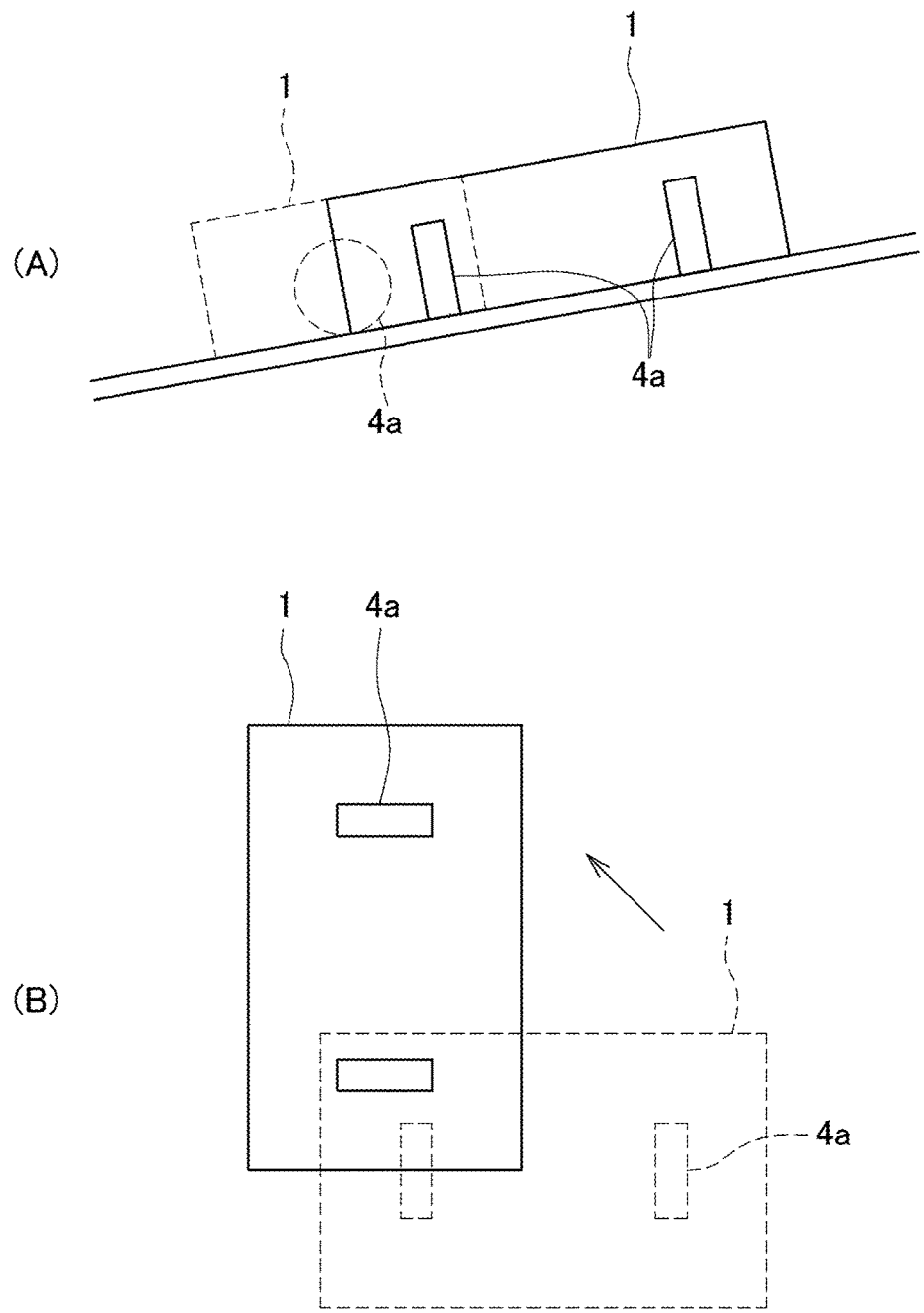
FIG. 3 is a schematic explanatory view illustrating a resting state of the self-propelled robot 1 of the embodiment.

As described above, when the driving wheels 4a and 4a are disposed while the rotation planes of the driving wheels 4a and 4a are orthogonal to the inclination direction, the running of the self-propelled robot 1 can be stopped even if the driving force (or braking force) is not applied to the driving wheels 4a and 4a (see FIG. 3(A)). In the case that the self-propelled robot 1 is stopped in the inclined target flat surface SF, desirably the control is performed so as to obtain the above state. That is, in the case that the controller 30 detects an end of the cleaning or abnormal occurrence, desirably the controller 30 controls the activation of the moving unit 4 such that the rotation planes of the driving wheels 4a and 4a are orthogonal to the inclination direction (in other words, the rotation axis directions of the driving wheels 4a and 4a are parallel to the inclination direction, hereinafter referred to as a resting state). For example, when the above state is detected while the rotation planes of the driving wheels 4a and 4a are not orthogonal to the inclination direction (parallel or acute-angle state), the self-propelled robot 1 is controlled so as to be turned, thereby obtaining the resting state (see FIG. 3(B)). In the case that the rotation planes of the driving wheels 4a and 4a are orthogonal to the inclination direction, the self-propelled robot 1 is controlled so as to be maintained as it is, thereby obtaining the resting state.

For the moving unit 4 including the crawler, in the case that the controller 30 detects the end of the cleaning or the abnormal occurrence, desirably the activation of the moving unit 4 is controlled such that the rotation direction of a crawler belt, namely, the belt axis direction is orthogonal to the inclination direction.

(Edge Detection)

As illustrated in FIGS. 1 and 2, desirably the self-propelled robot 1 includes an edge detector 31 that detects the edge (end edge) of the target flat surface SF. When the edge detector 31 is provided, the self-propelled robot 1 can be prevented from dropping from the target flat surface SF, and the target flat surface SF can efficiently be cleaned.

Figure 4:
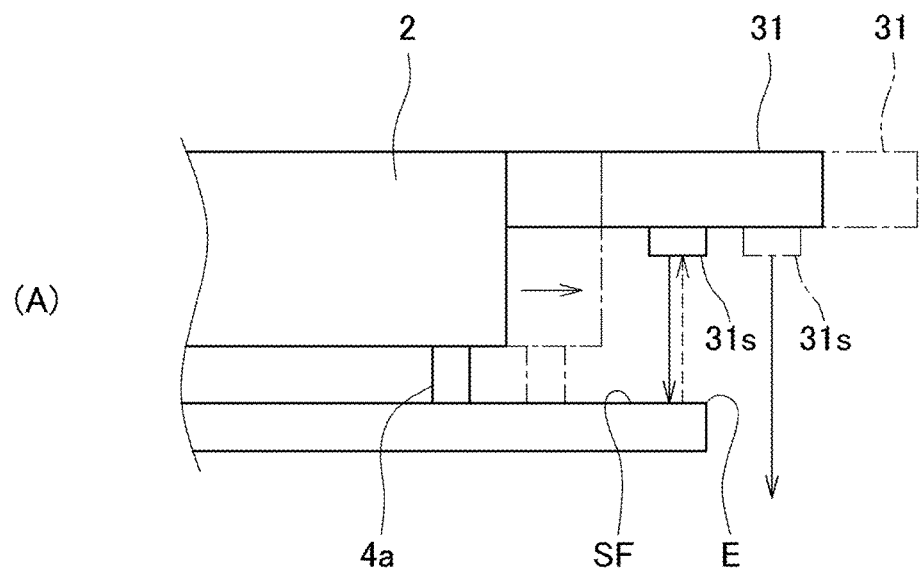
FIG. 4 is a schematic explanatory view illustrating edge detection performed with an edge detector 31.
Figure 4:
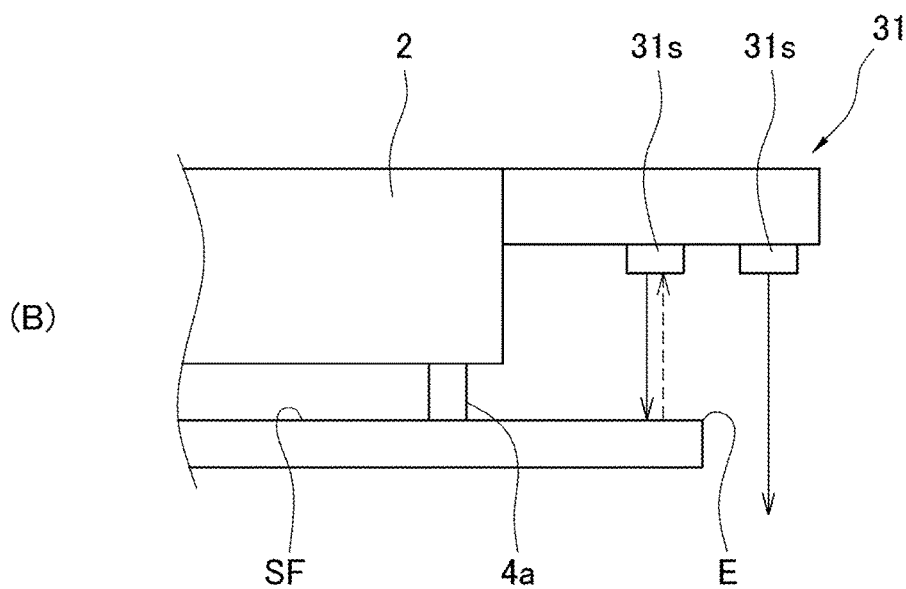

As illustrated in FIGS. 1 and 2, the edge detector 31 is laterally provided in the robot main body 2. The edge detector 31 includes a sensor 31s (see FIG. 4) that detects the edge (end edge) of the target flat surface SF, and the sensor 31s transmits a signal to the controller 30. Based on the signal detected with the edge detector 31, the controller 30 calculates a position of an edge and a distance to the driving wheel 4a (hereinafter, referred to as an adjacent driving wheel 4a) closer to the edge, and controls the moving unit 4 such that the distance is greater than or equal to a predetermined value.

For example, as illustrated in FIG. 4(A), it is assumed that the target flat surface SF exists immediately below the sensor 31s in the case that the sensor 31s is a laser sensor. In this case, when the sensor 31s emits a laser beam, the sensor 31s receives light reflected from the target flat surface SF. That is, it can be determined that the sensor 31s is positioned inside the edge. On the other hand, in the case that the sensor 31s cannot receive the reflected light, it can be determined that the target flat surface SF does not exist immediately below the sensor 31s, namely, that the sensor 31s is positioned out of the edge. When the controller 30 controls the activation of the moving unit 4 such that the reflected light can be received, namely, such that the sensor 31s is positioned inside the edge, the distance from the edge to the adjacent driving wheel 4a can be kept constant or more. Therefore, the adjacent driving wheel 4a of the self-propelled robot 1 can be prevented from derailing over the edge, or from dropping from the target flat surface SF.

When plural sensors 31s are provided, the distance from the edge to the adjacent driving wheel 4a can substantially be kept constant based on signals from the plural sensors 31s. As used herein, the term of "substantially constant" means that the distance between the edge and the adjacent driving wheel 4a falls within a constant range.

For example, as illustrated in FIG. 4(B), it is assumed that the edge detector 31 includes two laser sensors such that the laser sensors are arrayed in a width direction of the robot main body 2. It is also assumed that the sensor 31s located inside detects the reflected light while the sensor 31s located outside cannot detect the reflected light. In this case, it can be determined that the edge exists between the two sensors 31s. When the controller 30 controls the activation of the moving unit 4 such that the signals from the two sensors 31s are maintained in the above states, the distance from the edge to the adjacent driving wheel 4a can be kept constant. That is, the self-propelled robot 1 can be moved along the edge. For the linear edge, when the distance between the two sensors 31s is shortened, the self-propelled robot 1 can substantially linearly run while preventing from meandering. Therefore, the cleaning efficiency of the self-propelled robot 1 can be improved.

For example, it is assumed that the self-propelled robot 1 runs in a longitudinal direction of a module M constituting the target flat surface SF. In this case, a length of the cleaning unit 10 is set substantially equal to a length in a width direction of the module M. Therefore, even if the self-propelled robot 1 runs on the target flat surface SF only once, the whole target flat surface SF can be cleaned without the occurrence of the deficient cleaning.

(Example of Sensor 31s)

There is no particular limitation to the sensor 31s used as the edge detector 31, but a known sensor can be used. Examples of the sensors 31s include sensors, such as a laser sensor, an infrared sensor, and an ultrasonic sensor, which detect the edge in a non-contact manner and contact type sensors such as a limit switch. The controller 30 may detect the edge by analyzing an image captured with a CCD camera as the sensor 31s. A temperature sensor or an electrostatic capacitance sensor can be used as the sensor 31s. In the case these sensors are used as the sensor 31s, the edge of the target flat surface SF can be recognized from a temperature difference or an electrostatic capacitance difference between the target flat surface SF and a portion (such as a space) outside the edge.

Other Embodiments

In the case that the self-propelled robot 1 cleans the target flat surface SF (the module M constituting the target flat surface SF), usually the cleaning unit 10 is configured such that the length of the cleaning unit 10 is equal to or slightly longer than the length in the longitudinal direction or width direction of the target flat surface SF. When the self-propelled robot 1 is moved along the longitudinal direction or width direction of the target flat surface SF once, the whole target flat surface SF can be cleaned.

On the other hand, when the edge detector 31 is provided, as described above, the self-propelled robot 1 can stably be moved along the edge of the target flat surface SF. Therefore, even if the self-propelled robot 1 is miniaturized, the target flat surface SF can be cleaned without the occurrence of the deficient cleaning. Specifically, even if the length of the cleaning unit 10 is set shorter than the length in the longitudinal direction or width direction of the target flat surface SF, the self-propelled robot 1 can efficiently clean the whole target flat surface SF without the occurrence of the deficient cleaning.

As used herein, the length of the cleaning unit 10 means the length of a portion in which the target flat surface SF is substantially cleaned. For example, in the case that the cleaning unit 10 includes the brush 12 that cleans the target flat surface SF, the length of the brush 12 in a rotation axis direction corresponds to the length of the cleaning unit 10.

Figure 5:
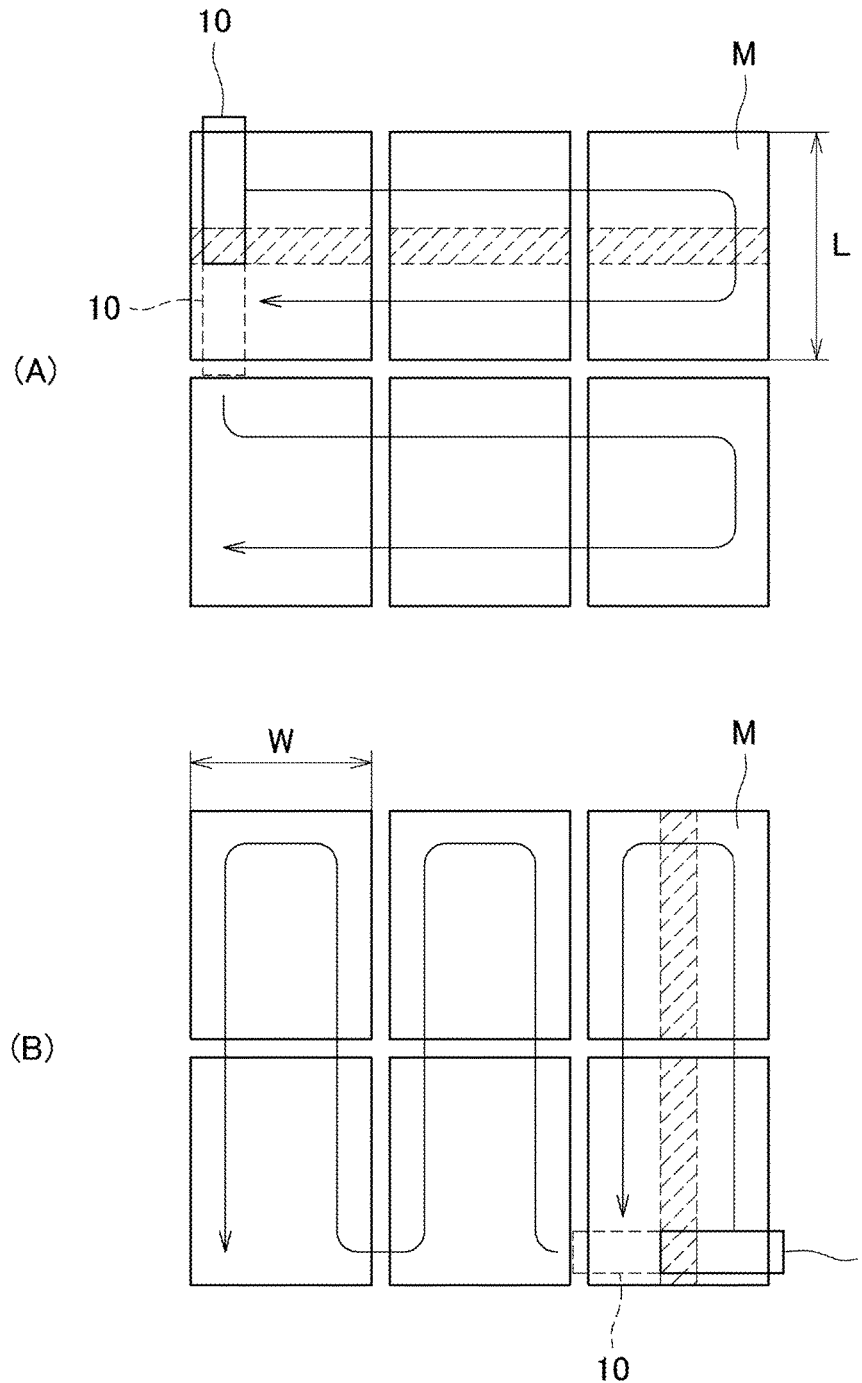
FIG. 5 is a schematic explanatory view illustrating a self-propelled robot 1 according to another embodiment.

For example, as illustrated in FIG. 5(A), the cleaning unit 10 is provided such that the length in the direction intersecting the running direction of the robot main body 2 is longer than a half of a length L in the major axis direction of the module M constituting the target flat surface SF and shorter than the length L in the major axis direction of the module M. In other words, the cleaning unit 10 is formed so as to be slightly longer than a half of the length L of the module M. In the case that the cleaning unit 10 includes the brush 12, the length of the brush 12 in the rotation axis direction is set lightly longer than a half of the length L in the major axis direction of the module M.

The self-propelled robot 1 including the cleaning unit 10 having the above structure is moved along a route indicated by an arrow in FIG. 5(A). That is, the front-back direction of the robot main body 2 is disposed so as to be parallel to the minor axis direction (width direction) of the module M, and the self-propelled robot 1 runs in the width direction of the module M, namely, the width direction of the target flat surface SF. At this point, the self-propelled robot 1 is moved along an upper end edge of the module M. When moved to an end portion in the width direction of the target flat surface SF, the self-propelled robot 1 is moved in a reverse direction. At this point, the self-propelled robot 1 is controlled so as to be moved along a lower end edge of the module M. Because the cleaning unit 10 is slightly longer than a half of the length L of the module M, an area where the cleaning unit 10 always passes through twice (a patched portion in FIG. 5(A)) is formed in a central portion in the length direction of the module M. When the self-propelled robot 1 goes and returns once in the width direction of the target flat surface SF, the cleaning unit 10 always cleans the whole surface of the module M, so that the target flat surface SF can efficiently be cleaned without the occurrence of the deficient cleaning.

In the case that the solar cell module or the like is provided while inclined, generally the longitudinal direction is inclined relative to the horizontal plane while the width direction becomes even. Therefore, when moved in the width direction of the module M, the self-propelled robot 1 is gradually moved downward along the surface of the target flat surface SF due to an influence of the gravity (for example, the self-propelled robot 1 is laterally moved while sliding downward). However, when the self-propelled robot 1 is moved along the upper end edge or lower end edge of the module M while the edge detector 31 detects the upper end edge or lower end edge of the module M, the self-propelled robot 1 can be moved along the crosswise direction while the downward movement is corrected. Accordingly, even if the self-propelled robot 1 is moved in the width direction of the module M, the self-propelled robot 1 can clean the target flat surface SF without the occurrence of the deficient cleaning.

As illustrated in FIG. 5(B), the cleaning unit 10 may be provided such that the length in the direction intersecting the running direction of the robot main body 2 is longer than a half of a length W of the width of the module M constituting the target flat surface SF and shorter than the length W of the width of the module M. In this case, when the self-propelled robot 1 is moved along a route indicated by an arrow in FIG. 5(B), the target flat surface SF can efficiently be cleaned without the occurrence of the deficient cleaning. That is, the front-back direction of the robot main body 2 is disposed so as to be parallel to the length direction of the module M, and the self-propelled robot 1 runs in the length direction of the module M, namely, the vertical direction of the target flat surface SF. When the self-propelled robot 1 is moved along the end edge on the right or left of the module M, an area where the cleaning unit 10 always passes through twice (patched portion in FIG. 5(B)) is formed in the central portion in the width direction of the module M. When the self-propelled robot 1 goes and returns once in the length direction of the target flat surface SF, the cleaning unit 10 always cleans the whole surface of the module M, so that the target flat surface SF can efficiently be cleaned without the occurrence of the deficient cleaning.

(Activation of Self-Propelled Robot 1)

In the self-propelled robot 1, the controller 30 controls the activation or the moving unit 4 or the operation such as the cleaning. Therefore, the activation of the self-propelled robot 1 is controlled such that the self-propelled robot 1 runs automatically on the route stored in the controller 30, the self-propelled robot 1 can perform the operation such as the cleaning while substantially automatically moved on the target flat surface SF.

On the other hand, a worker may externally manipulate the self-propelled robot 1 to control the running or the operation such as the cleaning of the self-propelled robot 1. That is, the worker may remotely control the self-propelled robot 1 by radio communication in which radio or infrared light is used. That is, the worker may manipulate a radio communication controller to remotely control the self-propelled robot 1. The worker may manipulate the self-propelled robot 1 using a controller connected to the self-propelled robot 1 through a signal line. When the worker manipulates the self-propelled robot 1 using the radio communication controller or the controller connected to the self-propelled robot 1 through the signal line, the worker can perform the operation while checking an operation situation of the cleaning or the like. Therefore, the self-propelled robot 1 can perform the proper operation according to a change of a surrounding situation.

Thus, even if the worker controls the activation of the self-propelled robot 1, desirably the self-propelled robot 1 has the edge detecting function and a derailment preventing function (to be described later). When the self-propelled robot 1 has these functions, the self-propelled robot 1 can properly run to perform the operation even if the worker makes a mistake. Even if the worker makes a mistake, the self-propelled robot 1 can be prevented from dropping from the target flat surface SF.

Both the manipulation performed by the worker and the automatic running (operation) may be adopted in the self-propelled robot 1. Usually the operation and the running is automatically performed (namely, the control is performed only with the controller 30), and the state of the automatic running (operation) may be switched to the activation manipulated by the worker when the worker inputs the manipulation from the controller or the like. In this case, when the input from the controller or the like is interrupted for a given time or more, the activation manipulated by the worker may be switched to the state of the automatic running (operation). Even if the worker makes a mistake, or even if the worker forget to switch to the state of the automatic running (operation), the operation can continuously be performed.

(Dropping Prevention)

As described above, in the case that the self-propelled robot 1 has the edge detection function, because the wheels 4a and 4b of the self-propelled robot 1 runs at the position separated from the edge by a given distance or more, the self-propelled robot 1 does not drop from the target flat surface SF. However, in the case that the edge of the target flat surface SF cannot properly be detected due to a malfunction of the edge detector 31, possibly the self-propelled robot 1 drops from the target flat surface SF.

When the self-propelled robot 1 has the following configuration, the dropping of the self-propelled robot 1 can be prevented even if the above situation occurs.

Figure 7:
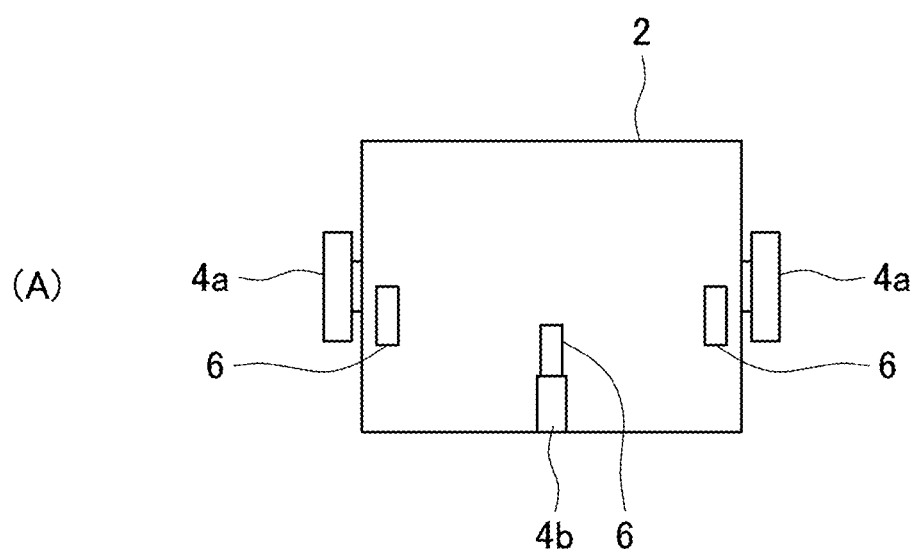
FIG. 7(A) is a schematic bottom view illustrating the self-propelled robot 1 of the embodiment to which a friction member 6 is attached.
FIG. 7(B) is a schematic explanatory view illustrating a contact state between a target flat surface SF and the friction member 6.
Figure 7:
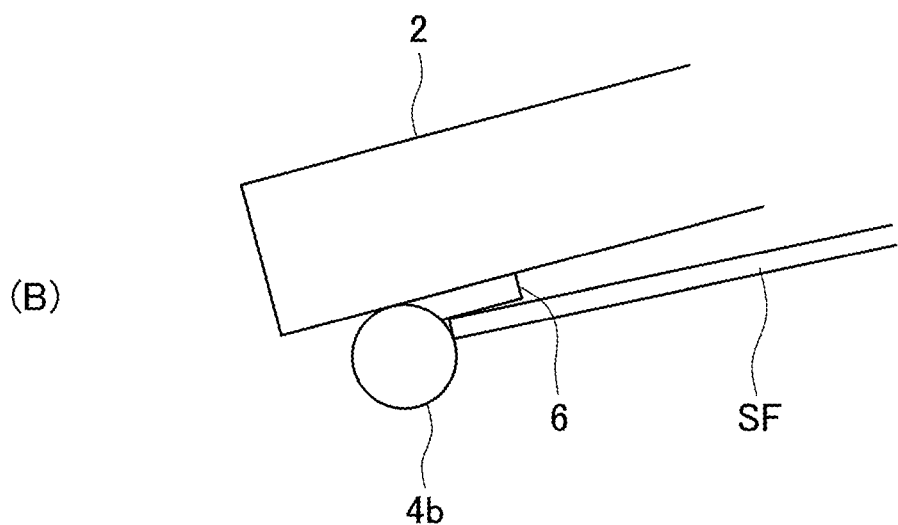

For example, as illustrated in FIG. 7, a friction member 6 (a resistance member in claims of the present invention), such as a rubber, which has a large friction resistance is provided in the bottom surface of the robot main body 2. Specifically, the friction member 6 is provided at the position where the robot main body 2 and the edge of the target flat surface SF come into contact with each other when the wheel 4b derails from the edge of the target flat surface SF. The friction resistance is generated between the friction member 6 and the edge of the target flat surface SF when the derailment occurs, so that the self-propelled robot 1 can be prevented from slipping down from the target flat surface SF.

Even if the friction member 6 is provided, possibly the self-propelled robot 1 cannot be prevented from slipping down from the target flat surface SF only by the frictional force of the friction member 6. For example, it is assumed that the driving force is applied in the direction in which the moving unit 4 moves the self-propelled robot 1 toward the edge. In this case, the large driving force overcomes the friction force of the friction member 6 to move the self-propelled robot 1. Therefore, the self-propelled robot 1 slips down from the target flat surface SF.

Accordingly, when the dropping occurs, preferably the controller 30 controls the activation of the moving unit 4 such that the self-propelled robot 1 is prevented from the slipping down from the target flat surface SF.

Figure 8:
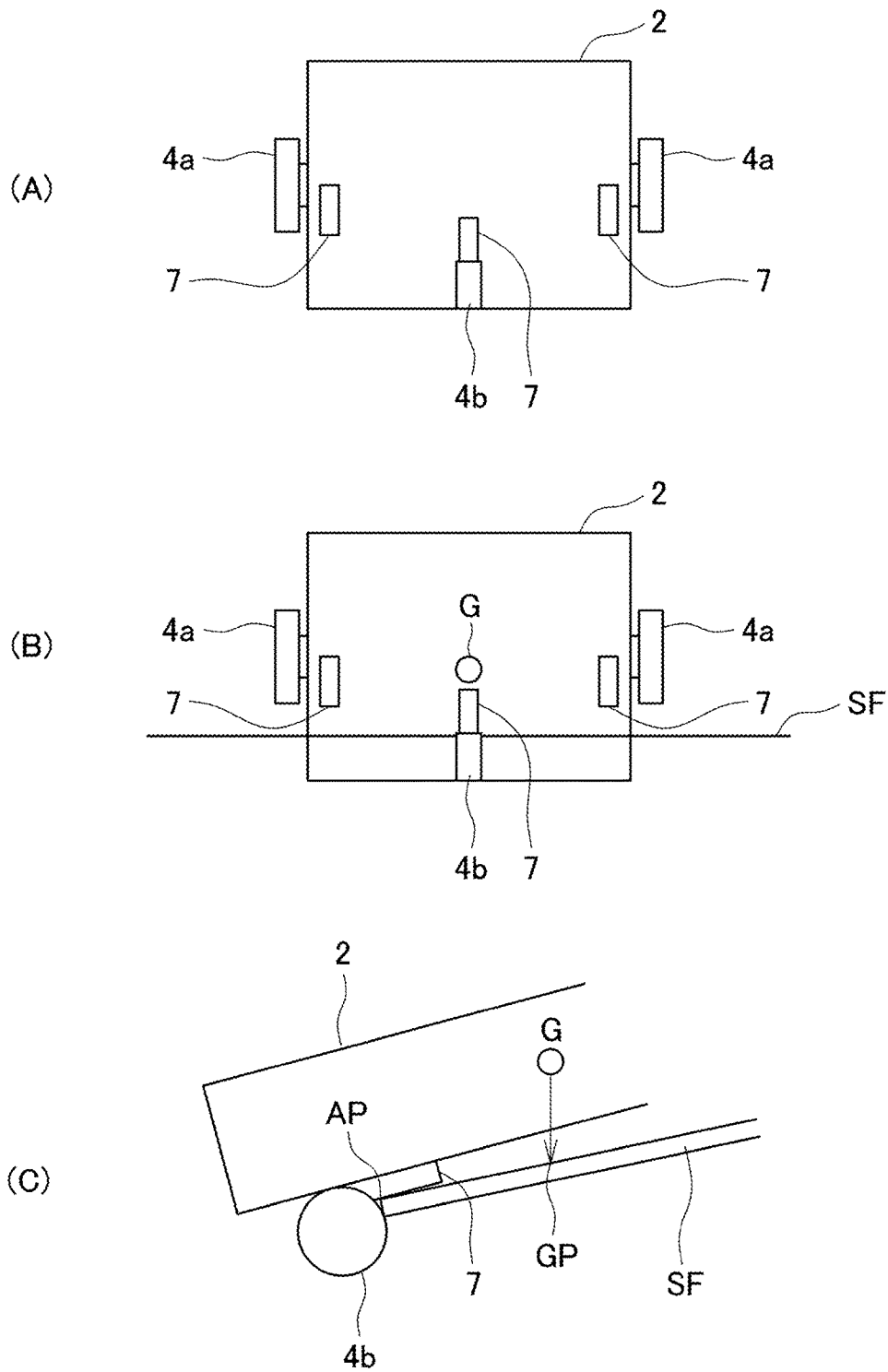
FIG. 8(A) is a schematic bottom view illustrating a robot main body 2 of the self-propelled robot 1 to which the friction member 6 is attached.
FIGS. 8(B) and 8(C) are schematic explanatory views illustrating the contact state between the target flat surface SF and the friction member 6.

For example, as illustrated in FIG. 8, a contact sensor 7 that detects the dropping is provided in the bottom surface of the robot main body 2. Specifically, the contact sensor 7 is provided so as to be located inside the robot main body 2 with respect to each wheel (on the side of a center of gravity G of the self-propelled robot 1 (see FIG. 7(B)). When detecting the contact with the target flat surface SF, the contact sensor 7 transmits a contact signal to controller 30. When receiving the contact signal, the controller 30 stops the activation of the driving unit of the moving unit 4. For example, in the case that a motor is used as the driving unit, current supplied to the motor is stopped. The force moving the self-propelled robot 1 toward the edge direction is not applied. Therefore, when the friction member 6 is provided, the self-propelled robot 1 can be prevented from slipping down from the target flat surface SF by the friction resistance generated between the friction member 6 and the edge. Even if the friction member 6 is not provided, the friction resistance generated between the robot main body 2 and the edge has certain magnitude, the self-propelled robot 1 can be prevented from slipping down from the target flat surface SF only by the friction resistance generated between the robot main body 2 and the edge (see FIG. 7(C)).

When the controller 30 receives the signal indicating the contact with the target flat surface SF from the signal contact sensor 7, the driving unit may be activated such that a driving resistance is generated in the wheels 4a and 4b. For example, in the case that the motor is used as the driving unit, the current is supplied to the motor such that the motor is reversely rotated. A braking device such as an electromagnetic brake may be provided in the driving unit, or a short brake function may be exerted by a short-circuit between terminals of the motor in order to obtain the braking force.

Desirably the contact sensor 7 is installed inside each of the wheels 4a and 4b on the main body side (on the side of the center of gravity G of the self-propelled robot 1). Therefore, when each of the wheels 4a and 4b derails, the contact sensor 7 disposed inside each of the wheels 4a and 4b can be brought into contact with the target flat surface SF. When the contact sensor 7 is provided at the above position, the center of gravity G of the self-propelled robot 1 is not located outside the edge in the state in which the contact sensor 7 detects the derailment. Specifically, as illustrated in FIG. 8(C), an intersection GP of the target flat surface SF and a line drawn downward from the center of gravity G of the self-propelled robot 1 is hardly located outside an intersection AP of the self-propelled robot main body 2 and the target flat surface SF (outside the end edge of the target flat surface SF). Therefore, even if the derailment occurs, the self-propelled robot 1 can be prevented from dropping from the target flat surface SF.

For example, even if the self-propelled robot 1 becomes the state in FIGS. 8(B) and 8(C), the center of gravity of the self-propelled robot 1 is located on the target flat surface SF. Therefore, when the driving unit is activated based on the signal from the contact sensor 7, the self-propelled robot 1 can be prevented from dropping from the target flat surface SF.

Figure 9:
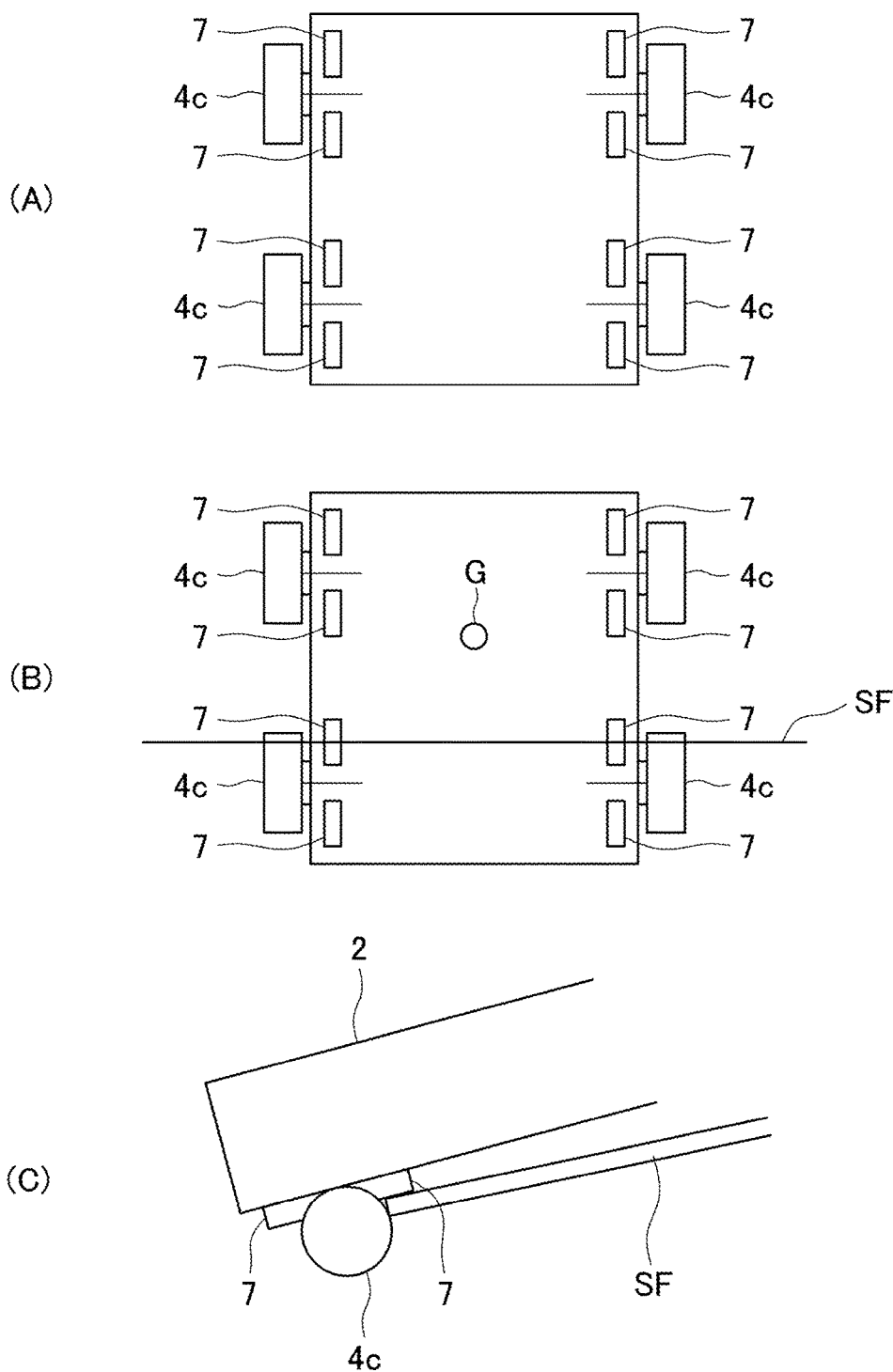
FIG. 9(A) is a schematic bottom view illustrating the robot main body 2 of the self-propelled robot 1 including four wheels 4c each of which a contact sensor 7 is attached to, and FIGS. 9(B) and 9(C) are schematic explanatory views illustrating the contact state between the target flat surface SF and the contact sensor 7.

As illustrated in FIG. 9, in the case that four wheels 4c are provided, the contact sensors 7 may be installed inside and outside the rotation axis of each wheel 4c. Therefore, even if the derailment occurs in various attitudes with respect to the self-propelled robot 1 and the edge of the target flat surface SF, the center of gravity G of the self-propelled robot 1 is hardly located outside the edge when the contact sensor 7 detects the derailment. That is, when the contact sensor 7 detects the derailment, the controller 30 can control the activation of the driving unit of the moving unit 4 to prevent the dropping of the self-propelled robot 1.

Figure 10:
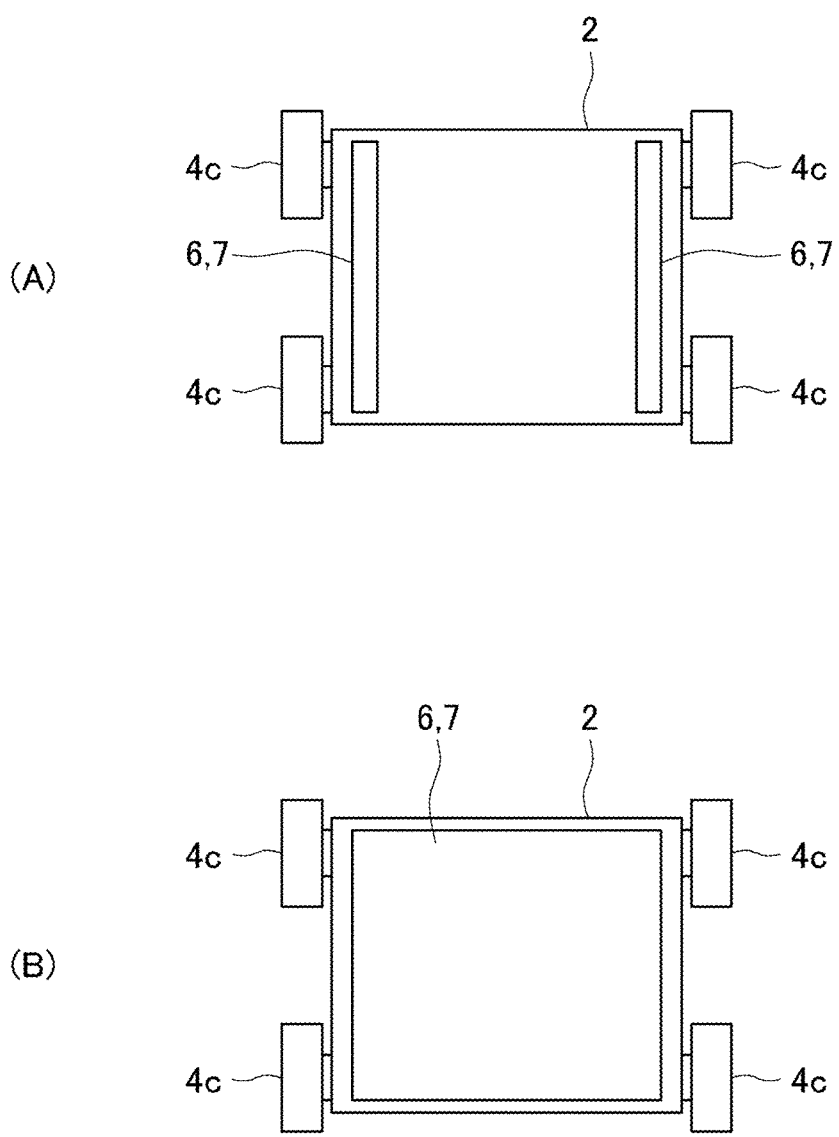
FIG. 10(A) is a schematic bottom view illustrating the robot main body 2 of the self-propelled robot 1 to which the belt-like friction member 6 and/or contact sensor 7 is attached.
FIG. 10(B) is a schematic bottom view illustrating the robot main body 2 of the self-propelled robot 1 to which the sheet-like friction member 6 and/or contact sensor 7 is attached.

There is no particular limitation to the sensor used as the contact sensor 7. For example, pressure sensitive rubbers such as a cable switch (product of Azvil corporation) and a tape switch (product of TOKYO SENSOR CO., LTD) can be used. There is no particular limitation to the position of the contact sensor 7. For example, in the case that the cable switch or the tape switch is used, the cable switch or the tape switch may be installed so as to be parallel to the rotation plane of the wheel 4c (or the wheel 4a in FIG. 7) (see FIG. 10(A)). In the case that the sheet-like sensor is used, the sensor may be provided over the whole bottom surface of the robot main body 2 (see FIG. 10(B)).

There is no particular limitation to the position where the friction member 6 is provided in the bottom surface of the robot main body 2. For example, the friction member 6 may be installed into a belt-like shape so as to be parallel to the rotation plane of the wheel 4c (or the wheel 4a in FIG. 7) (see FIG. 10(A)). The sheet-like friction member 6 may be provided over the whole bottom surface of the robot main body 2.

In the case that the controller 30 controls the driving force to prevent the dropping of the self-propelled robot 1, the friction member 6 is not always provided. However, when the friction member 6 is provided, the dropping of the self-propelled robot 1 is easy to prevent.

In order to prevent the dropping of the self-propelled robot 1, a sucker or a magnet can be used as the resistance member in addition to the friction member 6.

For example, the magnet is provided near one of the self-propelled robot 1 and the edge of the target flat surface SF, and the other is made from a ferromagnetic material or a member made from the ferromagnetic material is provided in the other. Because small magnetic force is generated between the self-propelled robot 1 and the edge of the target flat surface SF in the state in which the derailment does not occurs (when the self-propelled robot 1 and the edge are separated from each other), force coupling the self-propelled robot 1 and the target flat surface SF is not generated. That is, the self-propelled robot 1 can be moved on the target flat surface SF without a large resistance. On the other hand, when the distance between the self-propelled robot 1 and the edge is shortened due to the derailment, the large magnetic force is generated between the self-propelled robot 1 and the edge, whereby the self-propelled robot 1 is coupled to the target flat surface SF by the magnetic force. Accordingly, the self-propelled robot 1 can be prevented from dropping from the target flat surface SF. The magnets may be provided in both the self-propelled robot 1 and a vicinity of the edge of the target flat surface SF. Desirably a high-friction member such as a rubber sheet and a cork sheet adheres to the surface of the magnet. In this case, the friction force between the magnet and the target flat surface SF can further be enhanced, the self-propelled robot 1 can more surely be prevented from dropping from the target flat surface SF. A scratch, which is possibly generated when the magnet contacts the target flat surface SF, can be prevented.

In the case that the sucker is provided in the self-propelled robot 1, a pump is provided in order to suck air in the sucker. In this case, the controller 30 activates the pump when receiving a signal from the contact sensor 7. When the derailment occurs, the sucker sticks to the target flat surface SF, so that the self-propelled robot 1 can be coupled to the target flat surface SF. Accordingly, the self-propelled robot 1 can be prevented from dropping from the target flat surface SF. In this case, there is no particular limitation to the position of the sucker. The sucker may be installed at the position where the sucker is likely to be located on the target flat surface SF when the derailment occurs. A configuration in which the sucker is pressed against the target flat surface SF may be adopted instead of the pump. At this point, a structure, in which an inside becomes a negative pressure to stick to the target flat surface SF when the structure is pressed against the target flat surface SF, may be used as the sucker.

(Crawler)

Figure 11:
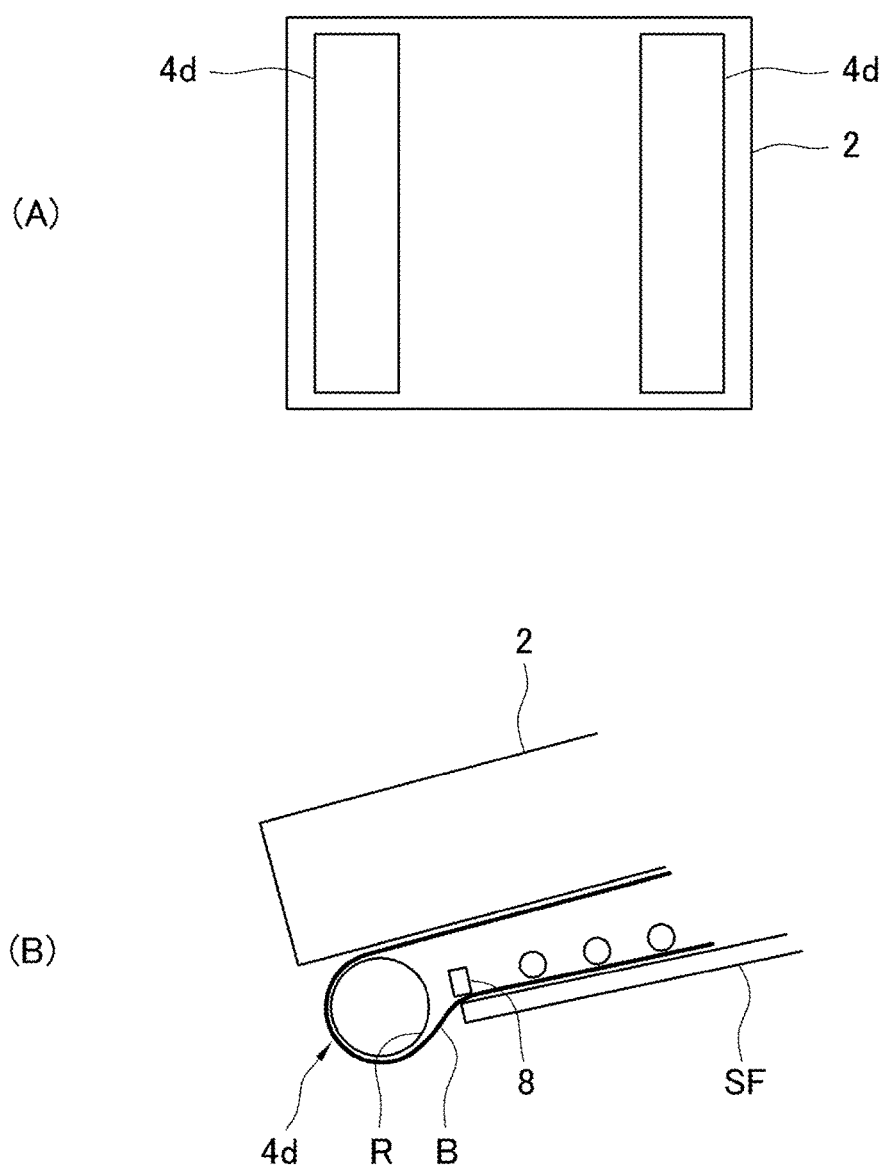
FIG. 11(A) is a schematic bottom view illustrating the robot main body 2 of the self-propelled robot 1 including a crawler 4d to which a deflection sensor 8 is attached to, and FIG. 11(B) is a schematic explanatory view illustrating a state in which the crawler 4d projects from an edge of the target flat surface SF.

For the moving unit 4 including the crawler, the situation corresponding to the derailment can be detected when a deflection sensor is provided in order to detect deflection of the crawler belt. That is, the situation in which the crawler projects from the edge of the target flat surface SF to a given extent or more can be recognized. For example, as illustrated in FIG. 11, when crawlers 4d and 4d project from the edge of the target flat surface SF to a given extent or more, a belt B is pressed inward than usual by the edge, and the belt B is deflected inward (see FIG. 11(B)). Accordingly, a deflection sensor 8 is provided in the crawler 4d in order to detect the deflection of the belt B, and the controller 30 stops the activation of the driving unit when the belt B is deflected to a given extent or more. The force moving the self-propelled robot 1 toward the edge direction is not applied, so that the self-propelled robot 1 can be prevented from slipping down from the target flat surface SF. When the controller 30 receives the signal from the deflection sensor 8, the driving unit may be activated such that the driving resistance is generated in the belt B. For example, in the case that the motor is used as the driving unit, the current is supplied to the motor such that the motor is reversely rotated. A braking device such as an electromagnetic brake may be provided in the driving unit, or a short brake function may be exerted by a short-circuit between terminals of the motor in order to obtain the braking force.

INDUSTRIAL APPLICABILITY

For example, the self-propelled robot of the present invention can be used in the solar cell array of the large-scale solar power generation facility, the condensing mirror used in the solar thermal power generation facility, the cleaning or flaw inspection of the flat surface such as the light receiving surface of the solar water heater, the measurement of the surface shape or thickness of the member, the temperature measurement, the surface roughness measurement, the measurement of the optical reflectance or glossiness in the surface, the measurement of other physical properties, the collection or observation, the peel-off of the surface adhesion or coating, the coating and the underlying treatment before the coating, the coating operation, the adhesion of the film, the polishing, the marking, and the communication conducted by presenting the information.

DESCRIPTION OF REFERENCE SIGNS 1. self-propelled robot
2. robot main body
4. moving unit
6. friction member
7. contact sensor
8. deflection sensor
10. cleaning unit
12. brush
30. controller
31. edge detector
31s. sensor
SP. structure
SF. target flat surface

The invention claimed is:

1. A self-propelled robot that self-travels on a structure having a flat surface to perform operation on the flat surface of the structure, the self-propelled robot, comprising:
   a robot main body in which a moving unit for the self-travel is provided; and
   a controller that controls movement of the robot main body,
   wherein the moving unit includes:
   one of a wheel and a crawler, the one of the wheel and the crawler running on the flat surface; and
   a driving unit that drives the one of the wheel and the crawler, and
   the controller has a function of controlling activation of the moving unit such that a rotation plane direction of the one of the wheel and the crawler is substantially orthogonal to an inclination direction of the flat surface when the self-propelled robot is caused to stand still on the flat surface.

2. The self-propelled robot according to claim 1, wherein the wheel runs on the flat surface,
   the driving unit drives the wheel,
   a contact sensor that detects derailment is provided in a bottom surface of the robot main body, and
   the controller stops the activation of the driving unit when the contact sensor detects a signal indicating contact with the flat surface.

3. The self-propelled robot according to claim 2, wherein the contact sensor is installed inside a rotation axis of each wheel.

4. The self-propelled robot according to claim 2, wherein four wheels are provided,
   the contact sensor includes multiple contact sensors, and
   the contact sensors are installed inside and outside the rotation axis of each wheel.

5. The self-propelled robot according to claim 1, wherein the wheel that runs on the flat surface,
   the driving unit drives the wheel,
   a contact sensor that detects derailment is provided in the robot main body, and
   the controller activates the driving unit such that a driving resistance is generated in the wheel when the contact sensor detects contact with the flat surface.

6. The self-propelled robot according to claim 5, wherein the contact sensor is installed inside a rotation axis of each wheel.

7. The self-propelled robot according to claim 5, wherein four wheels are provided,
the contact sensor includes multiple contact sensors, and
the contact sensors are installed inside and outside the rotation axis of each wheel.

8. The self-propelled robot according to claim 1, wherein the crawler runs on the flat surface,
the driving unit drives the crawler,
a deflection sensor that detects deflection of a belt of the crawler is provided, and
the controller stops the activation of the driving unit when the deflection sensor detects the deflection of the belt.

9. The self-propelled robot according to claim 1, wherein an edge detector that detects an end edge of the flat surface,
the crawler runs on the flat surface,
the driving unit drives the crawler,
a deflection sensor that detects deflection of a belt of the crawler is provided, and
the controller activates the driving unit such that a driving resistance is generated in the belt when the deflection sensor detects the deflection of the belt.

10. The self-propelled robot according to claim 1, wherein a resistance member is provided in a bottom surface of the robot main body.

11. The self-propelled robot according to claim 1, wherein the controller has the function of controlling the activation of the moving unit such that the self-propelled robot moves along an end edge of the flat surface based on a signal from an edge detector.

12. The self-propelled robot according to claim 11, further comprising a cleaning unit that cleans the flat surface,
wherein the cleaning unit is provided such that a length in a direction intersecting a running direction of the robot main body is longer than a half of a width of the flat surface and shorter than the width the flat surface.

13. The self-propelled robot according to claim 11, further comprising a cleaning unit that cleans the flat surface,
wherein the cleaning unit is provided such that a length in a direction intersecting a running direction of the robot main body is longer than a half of a long side of the flat surface and shorter than the long side the flat surface.

14. A self-propelled robot that self-travels on a structure having a flat surface to perform operation on the flat surface of the structure, the self-propelled robot, comprising:
a robot main body in which a moving unit for the self-travel is provided; and
a controller that controls movement of the robot main body,
wherein the controller includes an edge detector that detects an end edge of the flat surface,
the moving unit includes:
one of a wheel and a crawler, the one of the wheel and the crawler running on the flat surface; and
a driving unit that drives the one of the wheel and the crawler, and
the controller has a function of controlling activation of the moving unit such that a rotation plane direction of the one of the wheel and the crawler is substantially orthogonal to an inclination direction of the flat surface when the self-propelled robot is caused to stand still on the flat surface.

15. A self-propelled robot that self-travels on a structure having a flat surface to perform operation on the flat surface of the structure, the self-propelled robot, comprising:
a robot main body in which a moving unit for the self-travel is provided; and
a controller that controls movement of the robot main body,
wherein the controller includes an edge detector that detects an end edge of the flat surface,
the controller has a function of controlling activation of the moving unit such that a distance between the end edge of the flat surface and the moving unit is maintained to a given extent or more based on a signal from the edge detector,
the moving unit includes:
one of a wheel and a crawler, the one of the wheel and the crawler running on the flat surface; and
a driving unit that drives the one of the wheel and the crawler, and
the controller has a function of controlling activation of the moving unit such that a rotation plane direction of the one of the wheel and the crawler is substantially orthogonal to an inclination direction of the flat surface when the self-propelled robot is caused to stand still on the flat surface.

* * * * *